United States Patent
Mendel et al.

(10) Patent No.: US 6,249,959 B1
(45) Date of Patent: Jun. 26, 2001

(54) METHOD FOR PROCESSING AN INTEGRATED LEAD SUSPENSION

(75) Inventors: Carl Robert Mendel, Santa Clara; Darrick Taylor Smith, San Jose, both of CA (US); Dennis James Veerkamp, St. Charles; Steven Harry Voss, Rochester, both of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/476,515

(22) Filed: Jan. 3, 2000

Related U.S. Application Data

(62) Division of application No. 09/108,636, filed on Jul. 1, 1998, now Pat. No. 6,038,755.

(51) Int. Cl.[7] ............................. B23P 11/00; B23P 19/10
(52) U.S. Cl. ......................... 29/603.04; 29/464; 29/468
(58) Field of Search .......................... 29/603.04, 603.06, 29/737, 759, 464, 466, 467, 468, 281.1, 281.4, 281.5

(56) References Cited

U.S. PATENT DOCUMENTS

| | | |
|---|---|---|
| 3,744,127 | 7/1973 | Brede et al. . |
| 4,509,251 | 4/1985 | Gyi et al. . |
| 4,518,940 | 5/1985 | Fuchs . |
| 4,520,555 * | 6/1985 | Gyi et al. . |
| 4,615,721 | 10/1986 | Fuchs . |
| 4,625,393 | 12/1986 | Fuchs . |
| 4,809,427 * | 3/1989 | Suzuki et al. . |
| 4,854,036 | 8/1989 | DiGregorio . |
| 4,875,276 | 10/1989 | Yunokuchi et al. . |
| 4,901,430 * | 2/1990 | Noguchi et al. . |
| 4,964,941 | 10/1990 | Von Brandt et al. . |
| 5,033,184 | 7/1991 | Tandai et al. . |
| 5,623,759 | 4/1997 | Thorson et al. . |
| 5,729,889 * | 3/1998 | Goss . |
| 5,732,459 | 3/1998 | Shiraishi et al. . |
| 5,742,996 | 4/1998 | Frater et al. . |
| 5,936,806 * | 8/1999 | Pan et al. . |
| 6,038,755 | 3/2000 | Mendel et al. . |

FOREIGN PATENT DOCUMENTS 197710    10/1977    (SU) .

* cited by examiner

Primary Examiner—S. Thomas Hughes
(74) Attorney, Agent, or Firm—Douglas R. Millett; Felsman, Bradley, Vaden, Gunter & Dillon, LLP

(57) ABSTRACT

A tool block holds an integrated lead suspension during assembly. The tool block has a number of features for precisely positioning the integrated lead suspension while transducer heads are being mechanically and electrically connected to it. The most critical feature is a movable datum clamping pin which is positioned to precisely engage a mount plate on the integrated lead suspension. Other features of the tool block include a platform support, a locating hole, a platform clamp and a pivot arm.

13 Claims, 3 Drawing Sheets

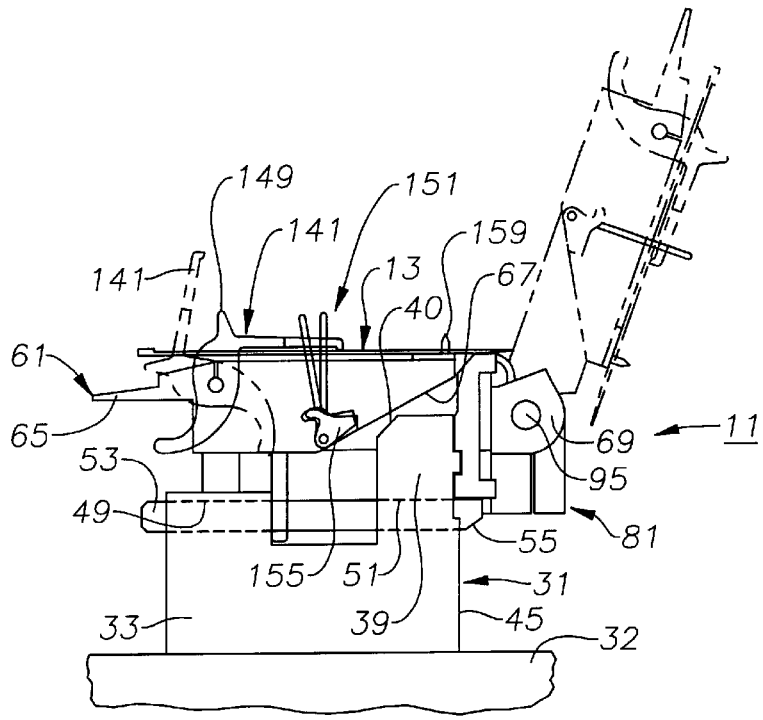
Fig. 1
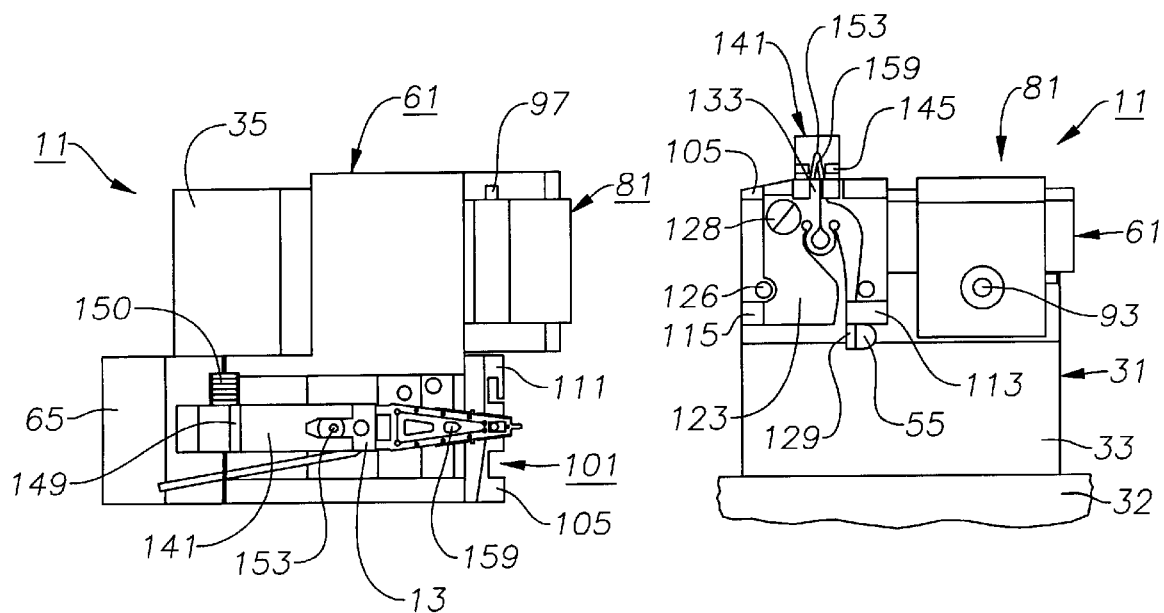
Fig. 2
Fig. 3

METHOD FOR PROCESSING AN INTEGRATED LEAD SUSPENSION

This application is a division of Ser. No. 09/108,636 filed Jul. 1, 1998 now Pat. No. 6,038,755.

TECHNICAL FIELD

This invention relates in general to tool blocks and in particular to a tool block for assembling transducer heads to an integrated lead suspension.

BACKGROUND ART

Integrated lead suspensions (ILS) for computer hard disk drive head gimbal assemblies were recently introduced. The ILS differs from prior art suspension designs as it has electrical leads which are an integral part of the suspension. The integrated leads of the ILS are typically connected to the suspension by an ultrasonic bonding process. Integrated leads allow the assembly to have smaller suspension geometries than its predecessors. One problem encountered with the ILS during manufacturing is that the smaller geometries require very precise positioning of the suspension and the transducer head when they are mechanically and electrically connected.

The ILS has electrical "J-leads" which are terminated to the head. Pitch Static Attitude (PSA) is a process control attribute of the ILS assembly. Pitch can be controlled by properly positioning the J-leads with respect to the head. Unfortunately, PSA is very difficult to control using ILS as residual elastic stress is produced when the J-leads are pushed into the termination pads of the head. Residual elastic stress from the J-leads produces an elastic bending moment which affects PSA. The J-leads are also extremely sensitive to handling damage and must be accurately positioned over the pads of the head. In addition, the PSA can be easily affected during the removal of the ILS assembly from a tool block. The latter two problems are especially sensitive if manual assembly procedures are utilized. A method and apparatus for precision assembly of the ILS is needed.

DISCLOSURE OF THE INVENTION

A tool block holds an integrated lead suspension during assembly. The tool block has a number of features for precisely positioning the integrated lead suspension while transducer heads are being mechanically and electrically connected to it. The most critical feature is a movable datum clamping pin which is positioned to precisely engage a mount plate on the integrated lead suspension. Other features of the tool block include a platform support, a locating hole, a platform clamp and a pivot arm.

BRIEF DESCRIPTION OF THE DRAWINGS

FIG. 1 is a side view of a tool block constructed in accordance with the invention and shown in both the open and closed positions.

FIG. 2 is a top view of the tool block of FIG. 1 shown in the closed position.

FIG. 3 is a front view of the tool block of FIG. 1 shown in the closed position.

BEST MODE FOR CARRYING OUT THE INVENTION

Figure 11:
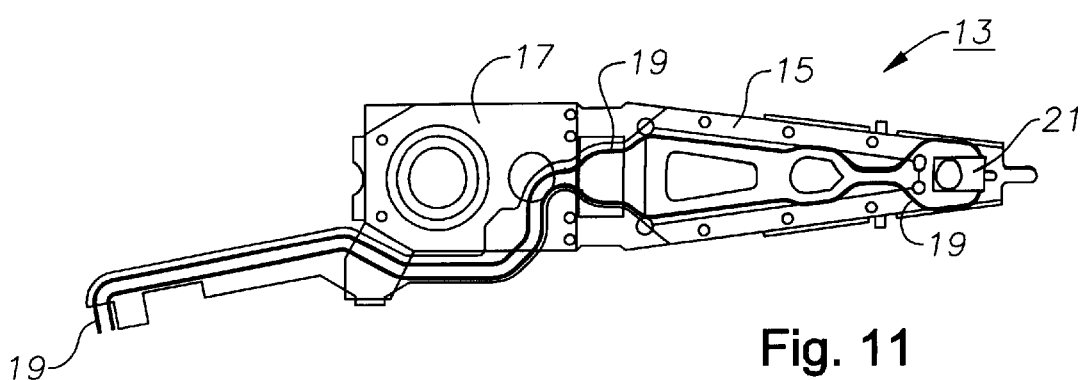
FIG. 11 is a plan view of an integrated lead suspension assembly.

Referring to FIGS. 1–3, a tool block assembly 11 for processing an integrated lead suspension assembly 13 is shown. Suspension assembly 13 (FIG. 11) comprises a cantilevered suspension 15 secured to and extending from a suspension platform 17. Suspension assembly 13 also has a plurality of integrated electrical leads 19 which extend along its length. One end of each lead 19 is ultrasonically bonded to transducer heads or sliders 21 during assembly.

Tool block assembly 11 comprises a number of primary components which must be assembled prior to its use. The largest component is a tool block base 31 which is permanently mounted to a pallet 32 (FIGS. 1 and 3). Although pallet 32 is provided to facilitate the use of assembly 11 during automated manufacturing of suspension assemblies 13, assembly 11 may also be used in manual assembly procedures as well.

Figure 5:
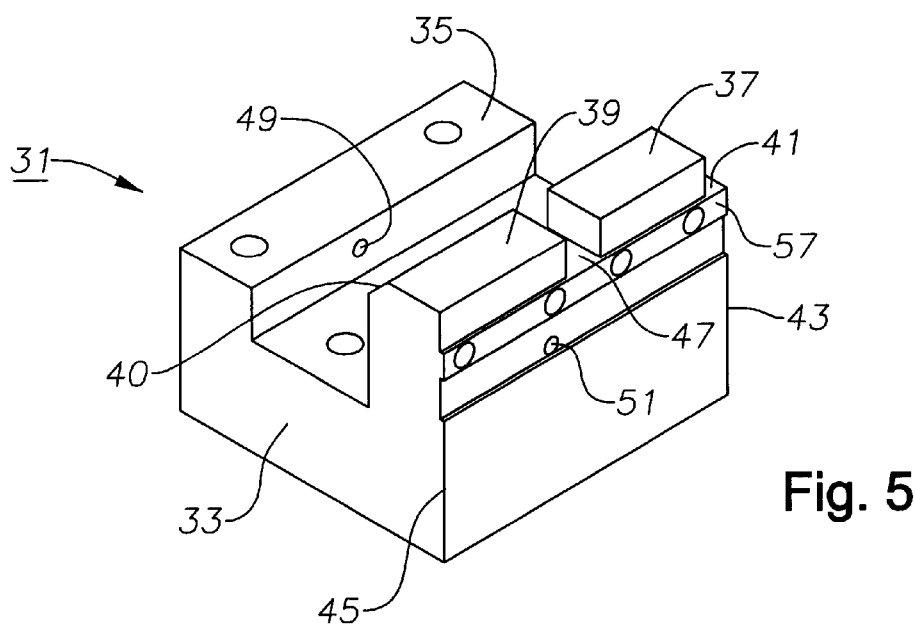
FIG. 5 is an isometric view of a base of the tool block of FIG. 1.

Referring to FIG. 5, base 31 is generally rectangular with a number of orthogonal features. A square lower portion 33 forms the foundation for base 31. A rectangular formation 35 extends upward from a rearward third of lower portion 33 along its rearward edge. Formation 35 has the same width as lower portion 33. Two castellations 37, 39 extend upward from a forward third of lower portion 33 along its forward edge. Castellations 37, 39 are asymmetrical and are each less than half the width of lower portion 33. Castellation 39 has a chamfer 40 on an upper rearward edge. A square notch 41 offsets castellation 37 from a side edge 43 of base 31. Castellation 39 is flush with an opposite side edge 45. A second square notch 47 separates castellations 37, 39 from each other. A pair of coaxial holes 49, 51 extend through formation 35 and castellation 39, respectively. As shown in FIG. 1, a round pin 53 having a chamfer 55 on a forward end extends through holes 49, 51 and protrudes from either end of base 31. A square rib 57 extends horizontally across the entire width of the forward surface of base 31.

Figure 4:
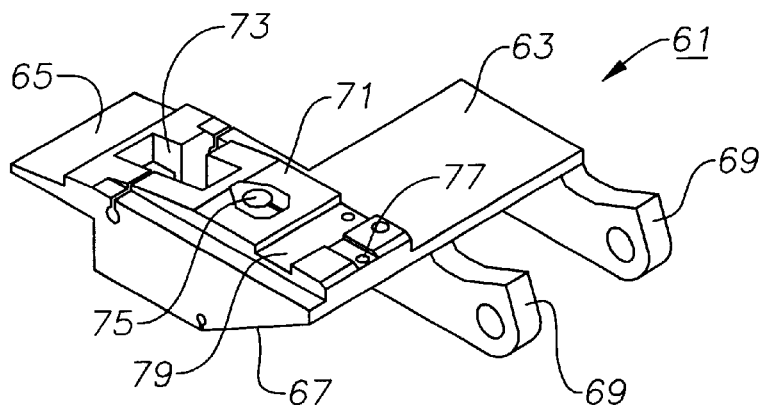
FIG. 4 is an isometric view of a pivot arm of the tool block of FIG. 1.

Referring to FIG. 4, a second major component of assembly 11 is pivot arm 61. Pivot arm 61 is a generally planar member with an L-shaped body 63 when viewed from above. Body 63 is generally trapezoidal when viewed from the side. A flat lift tab 65 extends horizontally rearward from body 63. A lower forward portion 67 is inclined at an approximately 30° angle and extends from a forward edge of body 63. A pair of vertical, flat fingers 69 extend symmetrically forward from one side of the forward edge of body 63. The opposite side of body 63 has a detailed raised platform 71 on an upper surface. A rectangular hole 73 is located in a rearward portion of platform 71 and extends downward completely through body 63. Platform 71 also has a centrally located round hole 75 and a round hole 77 at its forward edge. Holes 73, 75 and 77 are all centered and aligned with one another from front to back on platform 71. A shallow rectangular notch 79 separates holes 75 and 77 from one another.

Figure 6:
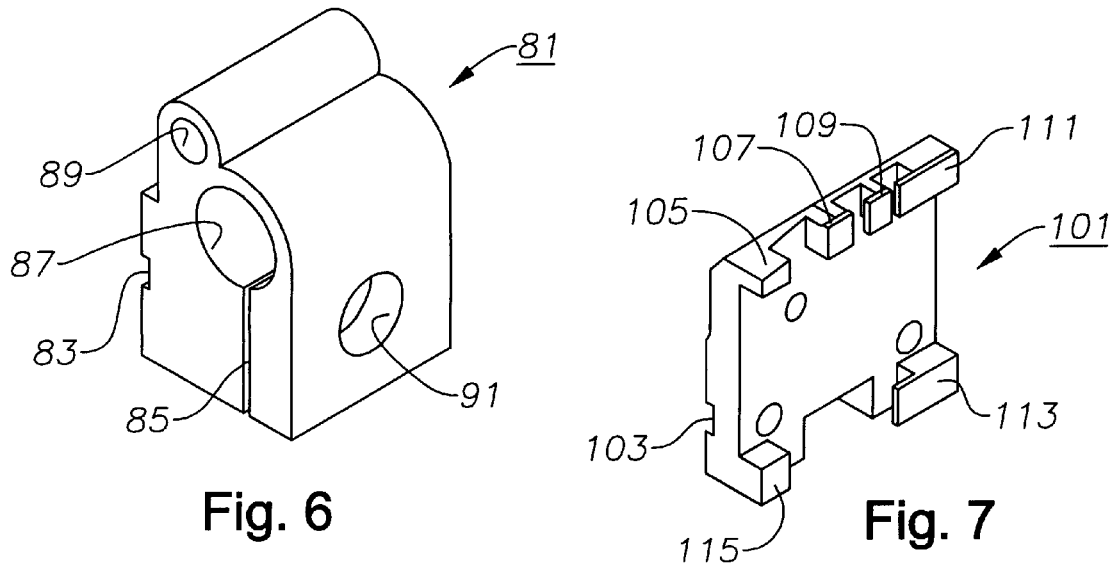
FIG. 6 is an isometric view of a pivot bracket of the tool block of FIG. 1.
Figure 7:
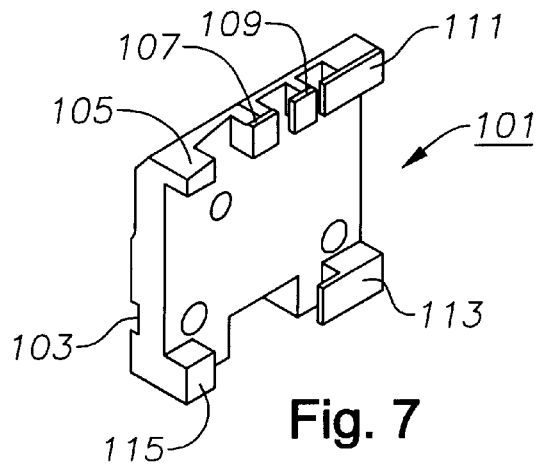
FIG. 7 is an isometric view of a mounting bracket of the tool block of FIG. 1.

Referring now to FIGS. 1 and 6, pivot arm 61 is attached to base 31 through pivot bracket 81. Like the other components, pivot bracket 81 is generally rectangular but has a rounded upper end. A square recess 83 extends horizontally across a backside of pivot bracket 81 and is provided for aligning with and engaging square rib 57 on base 31. Pivot bracket is split along a vertical slot 85 which intersects a large transverse hole 87. Another transverse hole 89 is located above, rearward and parallel to hole 87. A third hole 91 is longitudinal and is provided for receiving a fastener 93 (FIG. 3) for securing pivot bracket 81 to base 31. As shown in FIGS. 1 and 2, pivot arm 61 is pivotally joined to pivot bracket 81 by inserting a pin 95 through fingers 69 and hole 87. When a spring-biased pin 97 is mounted in hole 89, pivot arm 61 may be pivoted and locked from movement in either its horizontal position (FIGS. 1–3), or in its raised position (indicated by phantom lines in FIG. 1). Pivot arm 61 pivots approximately 110° between its horizontal (closed) and raised (open) positions.

As shown in FIGS. 1–3 and 7, assembly 11 also comprises a mounting bracket 101. Mounting bracket 101 is a generally rectangular, vertical member which fastens to a front surface of castellation 39 and body 33. Like pivot bracket 81, mounting bracket 101 has a square recess 103 which extends horizontally across its backside for aligning with and engaging square rib 57 on base 31. Mounting bracket 101 also has numerous short orthogonal protrusions 105, 107, 109, 111, 113, 115 which extend from its forward surface adjacent to its upper and lower edges. Protrusions 105–115 are provided for precisely engaging a spring clamp 121 (FIG. 10), described below.

Figure 10:
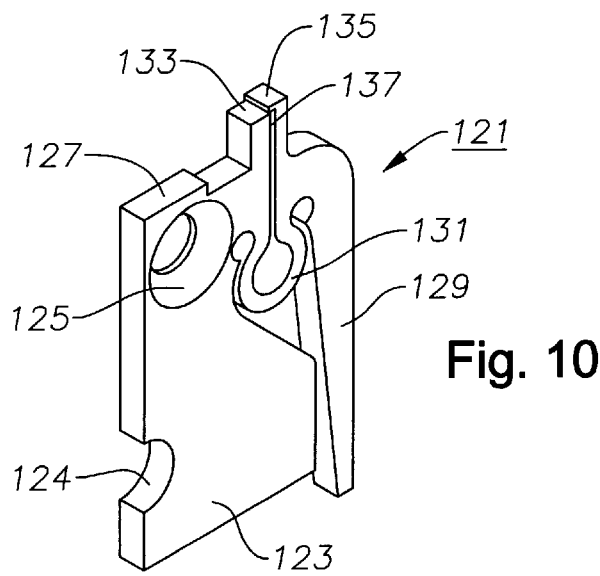
FIG. 10 is an isometric view of a spring clamp of the tool block of FIG. 1.

Referring now to FIG. 10, spring clamp 121 is a flat member with several S-shaped configurations. Spring clamp 121 has a generally planar body 123 with a notch 124 along a side edge for accommodating a fastener 126 (FIG. 3), and a through-hole 125 near its upper edge for a fastener 128. A raised square rib 127 protrudes from the upper edge of body 123 and is received between protrusions 105, 107 on mounting bracket 101. A long, downward-pointing tine 129 is located on an opposite side of body 123. Tine 129 has a vertical dimension which is slightly longer than and extends below body 123. Tine 129 is received by protrusion 113 on mounting bracket 101 and is designed to be engaged by chamfer 55 on pin 53 during operation. Tine 129 and body 123 are joined by a U-shaped member 131 which forms a pair of asymmetrical, upward-pointing tines 133, 135. Tines 133, 135 are separated by a vertical slot 137 and engage protrusions 107, 109 and 111 on mounting bracket 101.

Figure 8:
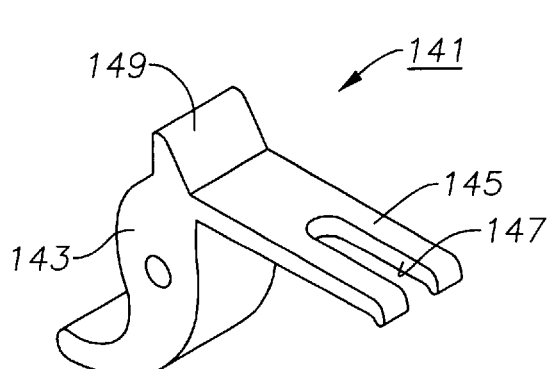
FIG. 8 is an isometric view of a platform clamp of the tool block of FIG. 1.

Referring to FIG. 8, a platform clamp 141 having a generally seahorse-shaped configuration when viewed from the side is shown. Platform clamp 141 has an S-shaped body 143 and a pair of symmetrical arms 145 which extend horizontally forward from body 143 and are separated by a U-slot 147. A trigger-type member 149 extends upward from body 143. Platform clamp 141 is pivotally mounted in rectangular hole 73 in pivot arm 61 so that it may be rotated approximately 90° in a vertical plane between a closed position (FIGS. 1–3) and an open position (indicated by phantom lines in FIG. 1). Platform clamp 141 is biased forward by a spring 150 (FIG. 2) which is located on its side in hole 73.

Figure 9:
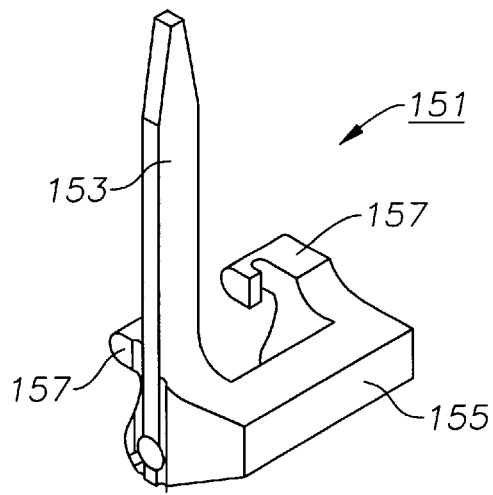
FIG. 9 is an isometric view of a pivot pin of the tool block of FIG. 1.

The final component of assembly 11 is shown in FIG. 9. A movable datum or pivot pin 151 has a pointed arm 153 extending upward from a generally rectangular body 155. Arm 153 is located to one side of body 155 while a pair of curved fingers 157 extend symmetrically rearward from body 155. Fingers 157 are provided for engaging an internal spring mechanism (not shown) in pivot arm 61. As shown in FIGS. 1–3, arm 153 extends upward through hole 75 when pivot pin 151 is mounted in pivot arm 61. Pivot pin 151 is biased to a slightly inclined position which is offset from vertical in a rearward direction by approximately 20° (FIG. 1). Pivot pin 151 may be pivoted to an upright vertical position (indicated by phantom lines in FIG. 1). A small pointed pin 159 is located adjacent to arm 153 in hole 77. Pin 159 extends upward from hole 77 and is fixed from movement.

In operation, tool block assembly 11 is assembled as described above prior to processing integrated lead suspension assemblies 13. If assembly 11 is to be used in automated procedures, pallet 32 is required for proper positioning and manipulation on a conveyor processing system (not shown).

Prior to receiving a suspension assembly 13, tool block assembly 11 is configured as shown by the solid lines in FIG. 1. Pivot clamp 141 is rotated counterclockwise to its open position (indicated by phantom lines in FIG. 1) and pin 53 is activated to the right. By actuating pin 53, arm 153 of pivot pin 151 is rotated clockwise (indicated by phantom lines in FIG. 1) to receive a suspension assembly 13 which is dropped or placed on platform 71 of pivot arm 61. As assembly 13 is placed on pivot arm 61, arm 153 inserts through a hole in suspension platform 17 to precisely locate suspension assembly 13 in a lengthwise direction. Pivot clamp 141 is returned to the closed position (FIGS. 1–3) so that fingers 145 contact and hold suspension platform 17 against platform 71 and arm 153 is located in U-slot 147 of pivot clamp 141. Pin 53 is returned to the left position so that pivot pin 151 will overcome the clamping frictional force of clamp 141 and translate suspension 13 against datum pin 159. Pin 151 also serves to maintain angular alignment with respect to pin 159. Suspension assembly 13 is now flat against platform 71 for its entire length and the forward ends of leads 19 are perfectly positioned relative to tool block assembly 11. The combination of arm 153 and pin 159 provides high speed, automatic centering and positioning. Pivot pin 151 resists translational movement of assembly 13 when the it is supported on platform 71.

With suspension assembly 13 securely and precisely located in tool block assembly 11, spring pin 97 (FIG. 2) is depressed so that pivot arm 61 may be released and pivoted 110° to its engagement position (indicated by phantom lines in FIG. 1). After pivot arm 61 reaches the engagement position, spring pin 97 pops out on the opposite side of fingers 69 to lock it in that position. The obtuse angle of the pivot arm 61 enables automation features to be located just above the tool block assembly 11 for head 21. Head 21 is then loaded in the tool block assembly by placing at the tip of slot 137 between tines 133, 135. Pin 53 is actuated forward so that its chamfer 55 compresses the lower end of tine 129 on spring clamp 121. Compression of tine 129 opens U-member 131 and, thus slot 137 so that head 21 may be received between tines 133, 135. Pin 53 is then retracted and tines 133, 135 close on head 21 to hold it in place. Adhesive is then applied to the backside of head 21. Pivot arm 61 is returned to its starting position by again depressing spring pin 97 so that fingers 69 are disengaged and may rotate downward. Spring pin 97 pops back out when pivot arm 61 is horizontal so that pivot arm 61 is again locked in place. As pivot arm 61 swings downward, head 21 is bonded to leads 19 to complete the precision assembly 13.

To remove completed suspension assembly 13 from tool block assembly 11, pin 53 is actuated to the right so pivot pin 151 will translate assembly 13 slightly forward to ensure that head 21 is free from spring clamp 121. Next, pivot clamp 141 is again pivoted to its open position (indicated by phantom lines in FIG. 1). Once in the forward position, assembly 13 can be safely removed from tool block assembly 11 without affecting pitch static attitude. This process is repeated for each integrated lead suspension assembly 13.

The invention has several advantages. The locating pins of the tool block accurately position the ILS and its electrical leads relative to the head to minimize resultant bending stress. The tool block is pelletized and designed for automated processing to enhance quality. The components of the tool block permit the ILS assembly to be safely removed from the tool block without affecting the PSA. In addition, the tool block may be fabricated by relatively inexpensive wire electronic discharge machining.

While the invention has been shown or described in only some of its forms, it should be apparent to those skilled in the art that it is not so limited, but is susceptible to various changes without departing from the scope of the invention.

We claim:

1. A method for processing an integrated lead suspension having a suspension body and a slider, comprising:
   (a) placing the suspension body on a platform such that a datum pin engages a hole in the suspension body wherein the datum pin pivots relative to the platform to resist translational movement of the suspension body;
   (b) clamping the suspension body to the platform to retain the suspension body against the platform;
   (c) releasably retaining the slider in a slider holder; and
   (d) causing relative movement between the platform and the slider holder so that the slider makes contact with and adheres to the suspension body.

2. The method of claim 1 wherein step (d) comprises pivoting the platform relative to the slider holder such that the suspension body is brought into contact with the slider.

3. The method of claim 1 wherein step (d) comprises pivoting the platform approximately 110° relative to the slider holder.

4. The method of claim 1 wherein step (d) further comprises bonding the slider to the suspension body.

5. A method for processing an integrated lead suspension having a suspension body and a slider, comprising:
   (a) placing the suspension body on a platform such that it engages a suspension body retainer that resists translational movement of the suspension body;
   (b) clamping the suspension body to the platform to retain the suspension body against the platform:
   (c) releasably retaining the slider between a pair of tines in a spring clamp; and
   (d) causing relative movement between the platform and the slider holder so that the slider makes contact with and adheres to the suspension body.

6. A method for assembling an integrated lead suspension, comprising the steps of:
   (a) providing a slider, a suspension body with a pair of apertures, and a tool with a movable datum and a stationary datum;
   (b) locating the movable datum in a mounting position;
   (c) placing the suspension body on the tool such that one of each of the apertures in the suspension body engages the stationary and movable datums;
   (d) moving the movable datum to an engagement position such that the movable datum and the stationary align the suspension body relative to the tool;
   (e) securing the suspension body from movement relative to the tool;
   (f) placing the slider in a fixture; and
   (g) moving one of the tool and the fixture relative to the other such that the slider is mounted to the suspension body.

7. The method of claim 6 wherein step (g) comprises pivoting the tool relative to the fixture such that the suspension body is brought into contact with the slider.

8. The method of claim 6 wherein steps (b) and (d) comprise pivoting the movable datum pin relative to the tool.

9. The method of claim 6 wherein step (f) comprises clamping the slider in the fixture.

10. The method of claim 6 wherein step (g) further comprises bonding the slider to the suspension body.

11. A method for assembling an integrated lead suspension, comprising the steps of:
    (a) providing a slider, a suspension body with a pair of apertures, and a tool with a movable datum and a stationary datum;
    (b) locating the movable datum in a mounting position;
    (c) placing the suspension body on the tool such that one of each of the apertures in the suspension body engages the stationary and movable datums;
    (d) pivoting the movable datum to an engagement position such that the movable datum and the stationary align the suspension body relative to the tool;
    (e) securing the suspension body from movement relative to the tool;
    (f) placing the slider in a fixture; and
    (g) pivoting the tool relative to the fixture such that the suspension body is brought into contact with the slider and the slider is mounted to the suspension body.

12. The method of claim 11 wherein step (f) comprises clamping the slider in the fixture.

13. The method of claim 11 wherein step (g) further comprises bonding the slider to the suspension body.

* * * * *